ND Patent [19]

Dorsch et al.

[11] Patent Number: 4,944,989
[45] Date of Patent: Jul. 31, 1990

[54] COMPOSITIONS WHICH CROSSLINK IN THE PRESENCE OF MOISTURE AT ROOM TEMPERATURE TO FORM ELASTOMERS

[75] Inventors: Norman Dorsch, Burghausen; Oswin Sommer, Burghausen; Alois Strasser, Burghausen; August Schiller, Neuotting, all of Fed. Rep. of Germany.

[73] Assignee: Wacker-Chemie GmbH, Munich, Fed. Rep. of Germany

[21] Appl. No.: 255,234

[22] Filed: Oct. 11, 1988

[30] Foreign Application Priority Data

Nov. 5, 1987 [DE] Fed. Rep. of Germany ....... 3737458

[51] Int. Cl.[5] ...................... B32B 27/28; B32B 17/10; C08G 77/04
[52] U.S. Cl. .............................. 428/319.7; 428/319.3; 428/429; 428/447; 528/34; 528/37; 528/901; 524/860
[58] Field of Search ...................... 528/37, 34, 901, 18; 549/215; 524/731, 860; 428/319.3, 319.7, 427, 447

[56] References Cited

U.S. PATENT DOCUMENTS 3,886,118  5/1975  Nitzsche et al. ...................... 528/18
4,115,356  9/1978  Hilliard ................................ 528/18
4,208,503  6/1980  Martin .................................. 528/14
4,245,079  1/1981  Matsumoto et al. .................. 528/15
4,296,228  10/1981 Innertsberger et al. .............. 528/33
4,721,764  1/1988  Fujiki et al. ........................... 528/15
4,797,446  1/1989  Dietlein et al. ...................... 524/860

Primary Examiner—John C. Bleutge
Assistant Examiner—R. Dean, Jr.

[57] ABSTRACT

Compositions which can be stored in the absence of moisture, but crosslink in the presence of moisture at room temperature to form elastomers comprising a diorganopolysiloxane having terminal condensable groups, a silicon compound having at least three hydrolyzable groups bonded directly to silicon per molecule, an average of at least one acyloxy group being present as a hydrolyzable group per silicon atom in the silicon compound, and an organosilicon compound having at least one vicinal epoxy group, in which at least part of the organosilicon compound containing at least one vicinal epoxy group is a cyclic diorganopolysiloxane. These compositions are prepared by mixing under anhydrous conditions a diorganopolysiloxane having terminal condensable groups with a silicon compound having at least three hydrolyzable groups bonded directly to silicon per molecule, an average of at least one acyloxy group being present as a hydrolyzable group per silicon atom in the silicon compound and an organosilicon compound having at least one vicinal epoxy group, in which at least part of the organosilicon compound containing at least one vicinal epoxy group is a cyclic diorganopolysiloxane.

10 Claims, No Drawings

COMPOSITIONS WHICH CROSSLINK IN THE PRESENCE OF MOISTURE AT ROOM TEMPERATURE TO FORM ELASTOMERS

The present invention relates to compositions which crosslink in the presence of atmospheric moisture and more particularly to organopolysiloxane compositions which are stable under anhydrous conditions, but crosslink at room temperature when exposed to atmospheric moisture.

BACKGROUND OF THE INVENTION

Compositions which can be stored in the absence of moisture, but crosslink in the presence of moisture at room temperature to form elastomers are well known in the art. These compositions have been described in U.S. Pat. No. 4,296,228 to Innertsberger et al, Wacker-Chemie GmbH, in which a diorganopolysiloxane having terminal condensable groups is mixed with a silicon compound having at least three hydrolyzable groups bonded directly to silicon per molecule, an average of at least one acyloxy group being present as a hydrolyzable group per silicon atom in the silicon compound, and an organosilicon compound containing a vicinal epoxy group.

It is, therefore, an object of the present invention to provide compositions which can be stored in the absence of moisture, but crosslink in the presence of moisture at room temperature to form elastomers. Another object of the present invention is to provide compositions which crosslink in the presence of moisture by mixing a diorganopolysiloxane containing condensable terminal groups with a silicon compound having at least three hydrolyzable groups bonded directly to silicon per molecule, an average of at least one acyloxy group being present as a hydrolyzable group per silicon atom in the silicon compound, and an organosilicon compound containing at least one vicinal epoxy group. Still another object of the present invention is to provide compositions which crosslink at room temperature in the presence of moisture to form elastomers which adhere strongly to pore-free or closed-pore silicate substrates, in particular glass, on which they have been formed even after or during exposure to short-wave light.

SUMMARY OF THE INVENTION

The foregoing objects and others, which will become apparent from the following description, are accomplished in accordance with this invention, generally speaking, by providing compositions which can be stored in the absence of moisture, but crosslink in the presence of moisture at room temperature to form elastomers comprising a diorganopolysiloxane having terminal condensable groups, a silicon compound having at least three hydrolyzable groups bonded directly to silicon per molecule, an average of at least one acyloxy group being present as a hydrolyzable group per silicon atom in the silicon compound, and an organosilicon compound containing at least one vicinal epoxy group, in which at least part of the organosilicon compound(s) containing at least one vicinal epoxy group is a cyclic diorganopolysiloxane.

These compositions are prepared by mixing the diorganopolysiloxane containing terminal condensable groups with a silicon compound having at least three hydrolyzable groups linked directly to silicon per molecule, an average of at least one acyloxy group is present as a hydrolyzable group per silicon atom in the silicon compound and an organosilicon compound containing at least one vicinal epoxy group, in which at least part of the organosilicon compound containing at least one vicinal epoxy group is a cyclic diorganopolysiloxane.

DESCRIPTION OF THE INVENTION

The diorganopolysiloxanes containing terminal condensable groups which are used in the compositions of this invention may be any diorganopolysiloxane containing terminal condensable groups which have been, or could have been used heretofore, in the preparation of compositions which can be stored in the absence of moisture, but crosslink in the presence of moisture to form elastomers. These compositions are prepared by mixing the diorganopolysiloxane containing a terminal condensable group in each of the terminal units with a silicon compound having at least three hydrolyzable groups bonded directly to silicon per molecule, in which an average of at least one acyloxy group is present as a hydrolyzable group per silicon atom in the silicon compound and an organosilicon compound containing at least one vicinal epoxy group. The diorganopolysiloxanes which contain terminal condensable groups and are preferably used in the compositions of this invention may be represented, for example, by the formula

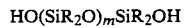

where R represents the same or different monovalent, SiC-bonded organic radicals, and m is an integer having a value of at least 10.

In addition to the diorganosiloxane units ($SiR_2O$), it is also possible for other siloxane units to be present within or along the siloxane chains of the above formula; however, these are not usually shown by formulas of this type. Examples of other siloxane units which may be present, but which are usually present only as contaminants and are more or less difficult to avoid, are in particular, those of the formulas $RSiO_{3/2}$, $R_3SiO_{\frac{1}{2}}$ and $SiO_{4/2}$, where R is the same as above. However, the amount of siloxane units of this type other than diorganosiloxane units is preferably at most 2 mole percent of the total siloxane units present in the diorganopolysiloxanes containing terminal condensable groups. If desired, all or some of the hydroxyl groups in the above formula can be replaced by other condensable groups, such as acyloxy groups, for example acetoxy groups, or alkoxy groups, for example, ethoxy groups.

The SiC-bonded organic radicals in the organosilicon compounds used in the present invention, and thus the radicals represented by R in the above formulas, preferably contain a maximum of 18 carbon atoms per radical. Examples of such radicals are hydrocarbon radicals, such as alkyl radicals, for example, the methyl, ethyl, n-propyl, isopropyl, n-butyl, sec-butyl and octadecyl radicals; hydrocarbon radicals containing an aliphatic multiple bond, for example, the vinyl and allyl radicals; cycloalkyl radicals, such as the cyclohexyl radical and methylcyclohexyl radicals; aryl radicals, for example, the phenyl radical and xenyl radicals; alkaryl radicals, for example, tolyl radicals; and aralkyl radicals, for example, the benzyl radical. These hydrocarbon radicals may contain substituents which are inert towards the substances, other than the diorganopolysiloxane containing terminal condensable groups, used in the preparation of the compositions of this invention. Additional examples of monovalent, SiC-bonded organic radicals present in the organosilicon compounds used in this invention, and thus the radicals represented by R in the above formulas, are monovalent halogenated hydrocarbon radicals, such as haloalkyl radicals, for example, the 3,3,3-trifluoropropyl radical, and haloaryl radicals, for example, the o-, p- and m-chlorophenyl radicals; monovalent aliphatic radicals containing carbon, hydrogen, ethereal oxygen and fluorine atom(s), for example, the gamma-1,1,2,2,3,3-hexafluoropropoxypropyl radical and the gamma-1,1,2,2-tetrafluoroethoxypropyl radical; acyloxyalkyl radicals, such as the gamma-acryloxypropyl radical and the gamma-methacryloxypropyl radical, and cyanoalkyl radicals, such as the beta-cyanoethyl radical. Due to their availability, it is preferred that at least 90 percent of the SiC-bonded organic radicals in the diorganopolysiloxanes containing terminal condensable groups and used in this invention, and thus the radicals represented by R in the above formulas, are methyl radicals.

The diorganopolysiloxanes containing terminal condensable groups may be the same or different homopolymers or copolymers. It is also possible that the individual molecules have the same or different chain lengths.

The average viscosity of the diorganopolysiloxanes containing terminal condensable groups is preferably from 50 to 500,000 mPa.s at 25° C.

The silicon compounds having at least three hydrolyzable groups bonded directly to silicon per molecule, an average of at least one acyloxy group being present as a hydrolyzable group per silicon atom in the silicon compounds of this type, which can be used in this invention are, likewise, any silicon compounds which have been, or could have been used heretofore, in the preparation of compositions which can be stored in the absence of moisture, but crosslink in the presence of moisture to form elastomers, by mixing a diorganosiloxane containing one terminal condensable group in each of the terminal units with a silicon compound containing at least three hydrolyzable groups bonded directly to silicon per molecule, in which an average of at least one acyloxy group is present as a hydrolyzable group per silicon atom in the silicon compound of this type. Examples of silicon compounds of this type are silanes of the formula $$R_a Si(OOCR^1)_b (OR^2)_{4-a-b}$$

in which R is the same as above, $R^1$ is hydrogen or a hydrocarbon radical, in particular an alkyl radical having 1 to 18 carbon atoms per radical, $R^2$ is an alkyl radical having 1 to 4 carbon atoms per radical, a is 0 or 1 and b is 1, 2 or 3.

Examples of alkyl radicals represented by $R^1$ are the methyl, ethyl, n-propyl, isopropyl, n-butyl, sec-butyl, tert-butyl, 2-ethylhexyl, myristyl and stearyl radicals.

Examples of alkyl radicals represented by $R^2$ are the methyl, ethyl, n-propyl, isopropyl, n-butyl, sec-butyl and tert-butyl radicals.

Additional examples of silicon compounds having at least three hydrolyzable groups bonded directly to silicon per molecule, an average of at least one acyloxy group being present as a hydrolyzable group per silicon atom in the silicon compounds of this type, are those which have been prepared by reacting tert-butoxyacetoxysilanes with methyltriacetoxysilane in a weight ratio of 3:7 to 1:9 at temperatures from 120° to 180° C.

(cf. U.S. Pat. No. 3,866,118 to Nitzsche et al, Wacker-Chemie GmbH) and those which can be obtained by reacting alkyltriacetoxysilane with tert-butanol and aqueous acetic acid (cf. U.S. Pat. No. 4,296,228 to Innertsberger et al, Wacker-Chemie GmbH). Still further examples of silicon compounds having at least three hydrolyzable groups bonded directly to silicon per molecule, in which an average of at least one acyloxy group is present as a hydrolyzable group per silicon atom in the silicon compounds of this type, are those mentioned in the above patents. The best known silicon compound of this type is methyltriacetoxysilane.

The silicon compounds having at least three hydrolyzable groups bonded directly to silicon per molecule, in which an average of at least one acyloxy group is present as a hydrolyzable group per silicon atom in the silicon compounds of this type, are preferably employed in amounts of from 1 to 15 percent by weight, based on the total weight of the composition which can be stored in the absence of moisture, but crosslinks in the presence of moisture at room temperature to form an elastomer.

The cyclic diorganopolysiloxanes containing at least one vicinal epoxy group are preferably those of the formula $$(R_a^3 R_{2-a} SiO)_n$$

in which R has the same meaning as R above, $R^3$ is a radical of the formula

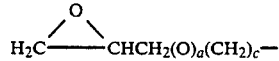

a has the same meaning as a above, c is 2 or 3 and n is an integer of from 3 to 9, in particular 4 to 6, with the proviso that a has a value of 1 in at least one of the units of the formula $$R_a^3 R_{2-a} SiO.$$

Each of the units of the formula $$R_a^3 R_{2-a} SiO$$

preferably contains a radical of the formula

It is furthermore preferred that a has a value of 1 and c has a value of 3 in the radical of the formula

The preferred cyclic diorganopolysiloxane is a mixture of those of the formula

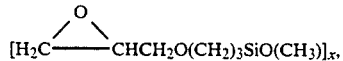

in which x is 4, 5 or 6.

The compositions of this invention preferably contain 0.2 to 2 percent by weight, based on the total weight of the composition, of a cyclic diorganopolysiloxane containing at least one vicinal epoxy group.

In addition to a diorganopolysiloxane having terminal condensable groups, a silicon compound having at least three hydrolyzable groups bonded directly to silicon per molecule, in which an average of at least one acyloxy group is present per silicon atom in the silicon compound of this type, and a cyclic diorganopolysiloxane containing at least one vicinal epoxy group, it is also possible to use in the compositions of this invention, substances which have been, or could have been used heretofore, in the preparation of compositions which can be stored in the absence of moisture, but crosslink in the presence of moisture at room temperature to form elastomers, by mixing a diorganopolysiloxane containing terminal condensable groups with a silicon compound having at least three hydrolyzable groups bonded directly to silicon per molecule, in which an average of at least one acyloxy group is present as a hydrolyzable group per silicon atom in the silicon compound of this type. Examples of substances which can be used in these compositions are inorganic fillers having a surface area of at least 20 m$^2$/g, inorganic fillers having a surface area of less than 20 m$^2$/g, pigments, soluble dyes, fragrance substances, organopolysiloxane resins, including those comprising (CH$_3$)$_3$SiO$_{\frac{1}{2}}$ and SiO$_{4/2}$ units, organic resins, such as polyvinyl chloride powders or powders comprising homopolymers or copolymers of acrylonitrile, ethylene, vinyl acetate, (meth)acrylates or styrene in which the organic resins could have been prepared in the presence of a diorganopolysiloxane containing terminal condensable groups. Other substances which may be used are corrosion inhibitors, oxidation inhibitors, bactericides, fungicides, heat stabilizers, solvents, agents for improving the adhesion of the elastomers produced from the compositions of this invention to the substrates on which they have been produced, such as gamma-glycidoxypropyltriethoxysilane, condensation catalysts, such as tin salts or organotin salts of carboxylic acids, such as di-n-butyltin diacetate, plasticizers, room temperature-liquid dimethylpolysiloxanes having terminal end-blocked trimethylsiloxy groups, or phosphoric acid esters, or mixtures of the above plasticizers, light screens and cell-producing agents, such as azodicarbonamide.

Examples of inorganic fillers having a surface area of at least 20 m$^2$/g are pyrogenically produced silicon dioxides, silica hydrogels which have been dehydrated while retaining the structure, i.e., so-called "Aerogels", and metal oxides, such as titanium dioxide, ferric oxide, aluminum oxide and zinc oxide. (The values indicated for the surface areas of the fillers are BET values, i.e., values determined by nitrogen adsorption in accordance with ASTM Special Technical Publication, No. 51, 1941, pages 95 ff).

Examples of fillers having a surface area of less than 20 m$^2$/g are: Quartz powder, diatomaceous earth, Neuburger chalk, calcium silicate, zirconium silicate, calcium carbonate, for example, in the form of ground chalk or in the form of finely divided needle-like crystals, calcined aluminum silicate and pulverulent sodium aluminum silicate having molecular sieve properties.

It is also possible to use fibrous fillers, such as asbestos or glass fibers or mixtures of the above fibers, in particular those having a maximum average length of 0.5 mm, or organic fibers or mixtures of organic fibers and inorganic fibers.

It is possible for at least some of the fillers mentioned above, if inorganic, to be rendered hydrophobic, for example, by treatment with dimethyldichlorosilane or trimethylethoxysilane or stearic acid or a mixture of at least two such hydrophobic agents. If desired, a treatment of this type can be carried out, for example, in a ball mill.

In the preparation of the compositions of this invention, it is possible to employ mixtures of different fillers having a surface area of at least 20 m$^2$/g or fillers having a surface area of less than 20 m$^2$/g or mixtures of at least one filler having a surface area of at least 20 m$^2$/g and at least one filler having a surface area of less than 20 m$^2$/g.

In order to prepare the compositions of this invention, all components of the composition can be mixed with one another in any desired sequence, but it is preferred that the cyclic diorganopolysiloxane having at least one vicinal epoxy group be added as the final component. Mixing is preferably carried out at room temperature and in the absence of water. If desired, however, this mixing can alternatively be carried out at elevated temperatures, for example at a temperature in the range of from 35° to 150° C.

The normal moisture present in the air is sufficient for crosslinking the compositions of this invention. If desired, the crosslinking can alternatively be carried out at temperatures above room temperature, for example, 35° to 150° C., or temperatures lower than room temperature, for example, at −5° to +10° C. The crosslinking can also be carried out using a concentration of water which exceeds the normal water content of air, for example, in water vapour.

The compositions of this invention are highly suitable for sealing horizontal, inclined or vertical joints and similar cavities with gaps of from, for example, 5 to 50 mm, for example of buildings, agricultural vehicles, aircraft or watercraft, as adhesives, in particular in structural glazing, i.e., in the sealing of frameless glass panes, including insulating glass units, on facade parts where stability of the adhesive under the influence of ultra-violet light is of particularly great importance, and for wood and purely organic plastics, such as polyvinyl chloride, polyamides or epoxy resins, for coating a wide variety of substrates, including woven and non-woven textiles, and for sealing window panes to the frame.

In the following examples and in preparation of the cyclic diorganopolysiloxane containing vicinal epoxy groups, all parts and percentages are by weight, unless otherwise specified.

EXAMPLE 1

About 65 parts of a dimethylpolysiloxane containing one Si-bonded hydroxyl group in each of its terminal units and having a viscosity of 80,000 mPa.s at 25° C., 23 parts of a trimethylsiloxy terminated dimethylpolysiloxane having a viscosity of 100 mPa.s at 25° C., 5 parts of methyltriacetoxysilane, 7.5 parts of a silicon dioxide produced pyrogenically in the gas phase and having a BET surface area of 150 m$^2$/g, 0.5 part of a mixture of organopolysiloxanes of the formula

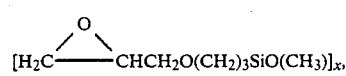

in which x is 4, 5 or 6, and 0.01 part of di-n-butyltin diacetate are mixed in a planetary-type mixer at room temperature and at 10 hPa (abs.).

EXAMPLE 2

The procedure described in Example 1 is repeated, except that 30 parts of ground chalk coated with stearic acid are added to the composition.

COMPARISON EXAMPLE (a)

The procedure described in Example 1 is repeated, except that the cyclic organopolysiloxane containing vicinal epoxy groups is omitted from the composition.

COMPARISON EXAMPLE (b)

The procedure described in Example 2 is repeated, except that the cyclic organopolysiloxane containing vicinal epoxy groups is omitted from the composition.

COMPARISON EXAMPLE (c)

The procedure described in Example 2 is repeated, except that 1.0 part of gamma-glycidoxypropyltrimethoxysilane is substituted for the 0.5 part of the mixture containing cyclic organopolysiloxanes having vicinal epoxy groups.

Strands of compositions prepared in accordance with the examples and the comparison examples are applied to glass plates which have been degreased and freed from dust on the side with traces of tin (from float glass manufacture) and on the side free from traces of tin and allowed to cure in air to form elastomers.

After 3 weeks, the elastomers produced from the strands are exposed at a distance of 50 cm using ultraviolet light with the spectrum required in DIN (Deutsche Industrie Norm) 52 455 of September 1974 (4 Osram Vitalux 300 w lamps, the phrase Osram Vitalux being a registered trademark of Messrs. Osram GmbH, Berlin and Munich, FRG). The results obtained on removing the elastomeric strands from the substrates are shown in the following table.

TABLE

| Days | Exposure Period | Examples | | Comparison Examples | | |
|---|---|---|---|---|---|---|
| | | 1 | 2 | (a) | (b) | (c) |
| 30 | Glass side with tin traces | C | C | A | A | A |
| 30 | Glass side without tin traces | C | C | AC | C | AC |
| 60 | Glass side with tin traces | C | C | A | AC | A |
| 60 | Glass side without tin traces | C | C | A | AC | A |
| 90 | Glass side with tin traces | C | C | A | A | A |
| 90 | Glass side without tin traces | C | C | A | A | A |

A = adhesive failure = separation of the elastomeric strand from the glass
C = cohesive failure = break in the elastomeric strand
AC = adhesive failure and cohesive failure Preparation of organopolysiloxanes containing vicinal groups.

A mixture of organopolysiloxanes of the formula

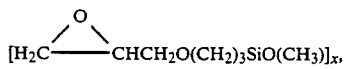

where x is 4, 5 and 6, is prepared in the following manner:

About 465 g of anhydrous (<1,000 ppm of water) allyl glycidyl ether and 155 g of toluene are stirred in a reaction vessel which has been tested for vacuum tightness, dried and flushed with nitrogen and is fed with nitrogen from the condenser side. About 1 g of dried, powdered activated charcoal and 0.2 ml of a 1 percent by weight solution of PtCl$_4$ in n-octane are added to the initially introduced mixture. After heating to 100° C., a solution containing 465 g of allyl glycidyl ether and 408 g of a mixture of cyclic methylhydrogen siloxanes containing 4 to 6 siloxane units per molecule in 150 g of toluene is added. The addition rate of the reactive mixture is adjusted so that a constant moderate reflux of toluene is produced, beginning at a bottom temperature of about 135° to 140° C. The addition time is about 30 to 45 minutes. The reaction is allowed to continue for about 30 minutes under reflux at 130° C. The activated charcoal is then removed by means of a simple filtration. The toluene is then removed from the filtrate by distillation. The excess allyl glycidyl ether is subsequently removed by distillation at 120° C. and at 10.6 to 13.3 hPa (abs.). About 1,160 g of a mixture of organopolysiloxanes of the above formula are obtained having a residual Si-H content of less than 0.02 percent.

What is claimed is:

1. A composition which can be stored in the absence of moisture, but crosslinks in the presence of moisture at room temperature to form elastomers comprising a diorganopolysiloxane having terminal condensable groups, a silicon compound having at least three hydrolyzable groups bonded directly to silicon per molecule, in which an average of at least one acyloxy group is present as a hydrolyzable group per silicon atom in the silicon compound and a cyclic diorganopolysiloxane having at least one vicinal epoxy group.

2. The composition of claim 1, wherein the cyclic diorganopolysiloxane is a mixture of organopolysiloxanes of the formula $$[H_2C\overset{O}{\overset{\diagup\diagdown}{-\!\!\!-\!\!\!-}}CHCH_2O(CH_2)_3SiO(CH_3)]_x$$

in which x is 4, 5 or 6.

3. The composition of claim 1, wherein the cyclic diorganopolysiloxane containing at least one vicinal epoxy group is present in an amount of from 0.2 to 2 percent by weight, based on the total weight of the composition.

4. The composition of claim 2, wherein the cyclic diorganopolysiloxane containing at least one vicinal epoxy group is present in an amount of from 0.2 to 2 percent by weight, based on the total weight of the composition.

5. A cross-linked composition which is obtained by exposing the composition of claim 1 to atmospheric moisture.

6. A cross-linked composition which is obtained by exposing the composition of claim 2 to atmospheric moisture.

7. A pore-free silicate surface which is obtained by applying the composition of claim 1 to a silicate surface and thereafter exposing the composition to atmospheric moisture.

8. Structural glazing which is obtained by applying the composition of claim 1 to frameless glass panes, contacting the frameless glass panes to facade parts and thereafter exposing the composition to atmospheric moisture.

9. A crosslinkable composition which can be stored in the absence of moisture, but crosslinks in the presence of moisture at room temperature to form an elastomer which is obtained by mixing a diorganopolysiloxane having terminal condensible groups with a silicon compound having at least three hydrolyzable groups bonded directly to silicon per molecule, in which an average of at least one acyloxy group is present as a hydrolyzable group per silicon atom in the silicon compound and a cyclic diorganopolysiloxane having at least one vicinal epoxy group.

10. The cross-linkable composition of claim 9, wherein the cyclic diorganopolysiloxane is a mixture of organopolysiloxanes of the formula

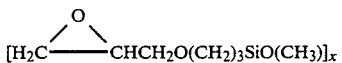

in which x is 4, 5 or 6.

* * * * *